*INVENTOR.*
NICHOLAS J. TOMEN

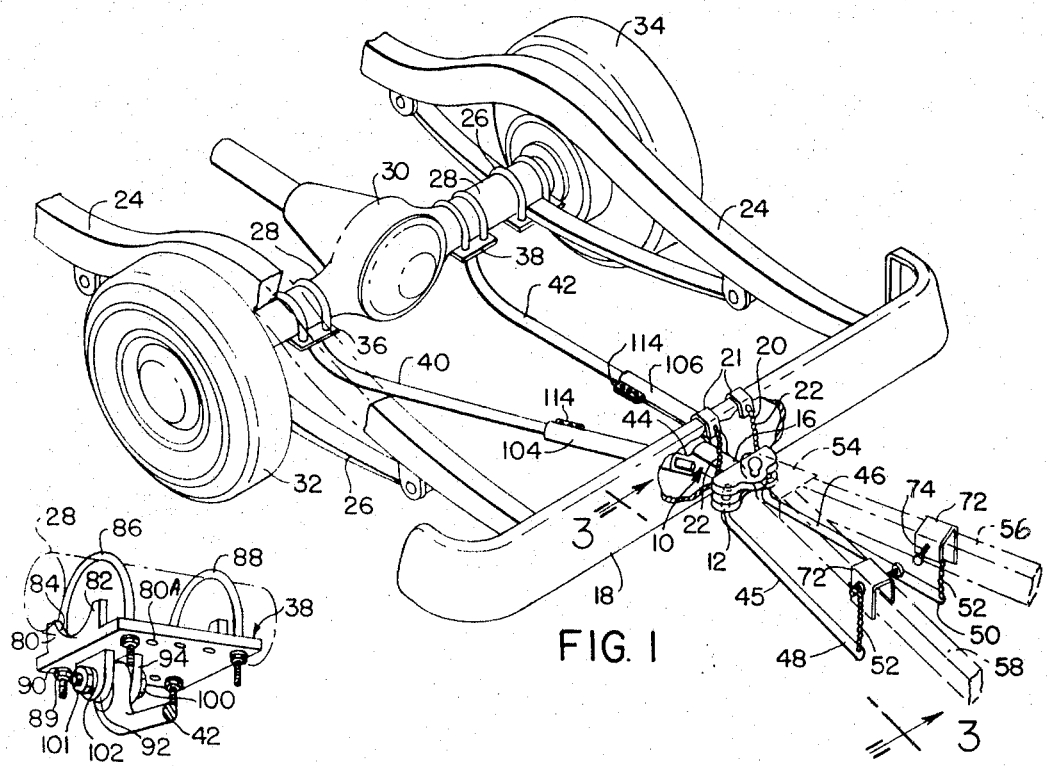

BY *Irving M. Weiner*

ATTORNEY

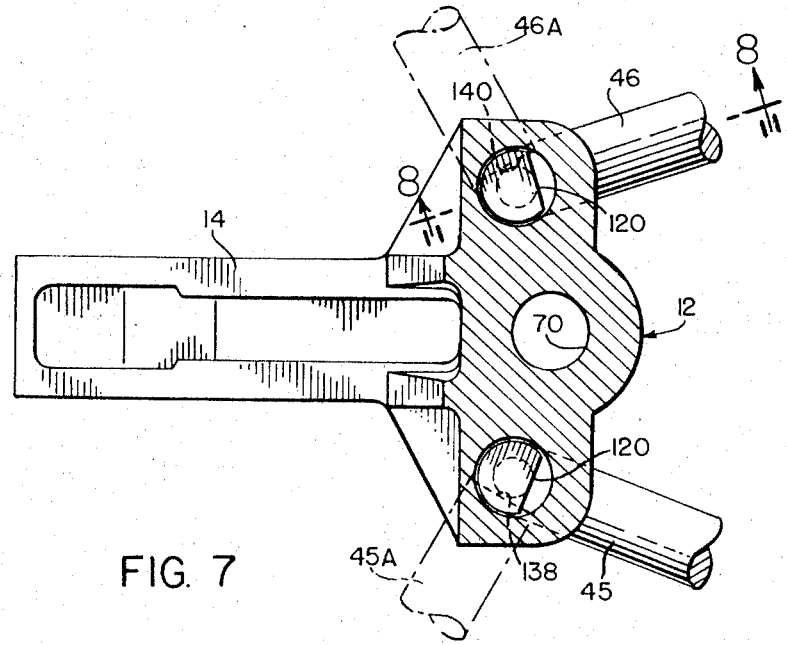
FIG. 7
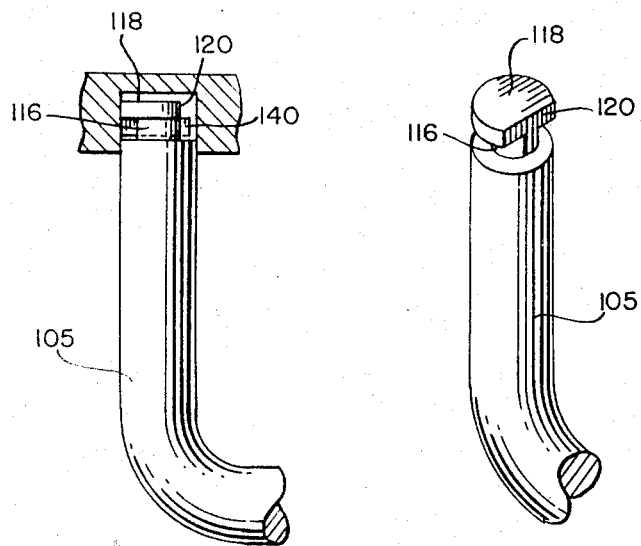
FIG. 8
FIG. 9
INVENTOR.
NICHOLAS J. TOMEN
BY *Irving M. Weiner*
ATTORNEY United States Patent Office 3,451,695
Patented June 24, 1969

3,451,695
TRAILER HITCH ASSEMBLY
Nicholas J. Tomen, 9 Churchill St., Chatham,
Ontario, Canada
Filed Mar. 6, 1967, Ser. No. 620,989
Int. Cl. B60d 1/06; B62d 53/06
U.S. Cl. 280—489                    13 Claims

ABSTRACT OF THE DISCLOSURE

A trailer hitch assembly having a pair of multi-position brackets about the rear axle of an automobile, and secured to and extending from said brackets, two torsion steel spring bars converging at and slidably adjustable within a Y-shaped collar, said collar being secured to a removable hitch head assembly; said head assembly having a central aperture therein to receive a pin having a cylindrical stem and a spherical or ball-like head upon which is mounted the mating socket portion of a conventional trailer, and to the right and left of said central aperture, two sockets adapted to receive, and within which are rotatively locked, a second pair of spring bars, said spring bars extending in a divergent manner rearwards of said automobile and being flexibly fastened to the towbar of the trailer to be towed, the trailer hitch assembly being fully interchangeable from automobile to automobile, regardless of make or year made, without the need for special additional hardware, or the need for special tools.

BACKGROUND OF THE INVENTION

This invention relates to a trailer hitch assembly which is fully transferable from automobile to automobile without the need for additional hardware or the need for special adapters. Today with many car owners purchasing a new automobile every two or three years, and in this age of the "two-car family," one of which is replaced about every other year, it is not an uncommon occurrence for the owner of such automobiles to transfer his trailer hitch assembly from one automobile to another. Today with the many different size automobiles ranging from the compact sized automobile to the full-sized station wagons, such transfers of a trailer hitch cannot generally be done without the need for special rear axle mounting brackets, specially sized spring bars, or the need to weld new anchor brackets to the frame of the automobile. Where the trailer hitch assembly is several years old, the availability of the special parts is oftentimes scarce, and their price costly in comparison to the price of the original assembly. And even where said special or additional equipment is readily available, the transfer of a trailer hitch assembly from one automobile to another is a time and labor consuming job requiring at least two workers and special tools.

The above problems are solved by the present invention which provides a trailer hitch assembly which can be transferred from one automobile to another automobile by one man in a matter of minutes without the use of special tools or the need for special adapter parts.

SUMMARY OF INVENTION

The invention is comprised of a pair of multi-position rear axle mounting brackets; a first pair of spring bars pivotally secured a one end to said multi-position brackets; a substantially Y-shaped collar member which receives in its two convergent legs the remaining free ends of the two spring bars, said bars being slidably adjustable within said convergent legs of the Y-collar member so that when the proper length of spring bar for the particular automobile is determined, the bars may be slidably secured within the collar member; a removable hitch head assembly which is mounted at the rear bumper of the automobile and to which is secured the Y-collar member; a second pair of substantially L-shaped interchangeable spring bars which are positively locked within said head assembly while being capable of pivotable movements about their vertical axes and having flexible suspension means attached to the horizontal legs; and a pair of towbar mounting brackets to which said flexible suspension means are secured. As will become apparent in the forthcoming description of the invention, each of the above components of the present invention is capable of being removed from a first automobile and installed upon a second automobile in a matter of minutes by a single man using such ordinary household tools as the screwdriver, wrench, pliers, and hammer.

It is also a major object of the invention to provide a trailer hitch assembly uilizing two pair of torsion carbon steel spring bars, a first pair operatively connected to the rear axle of an automobile and extending rearwards of said rear axle to a removable head assembly, and a second pair of spring bars extending rearwards from said head assembly and operatively connected to the towbar of the trailer, said configuration reducing trailer tendencies toward bouncing and side sway while transferring the trailer load to the drive wheels of the conventional American automobile thereby preventing slippage of the rear wheels, and increasing safety and towing efficiency.

Another object is to provide a secondary embodiment of the invention wherein said first pair of spring bars are replaced by a rigid telescopic tube disposed between the rear axle and rear bumper of the automobile, but operatively connected to the frame of the automobile so as to distribute the trailer load to all four wheels of the automobile.

Other objects and advantages of the invention will become apparent in the course of the following detailed description taken in conjunction with the attached drawings.

BRIEF DESCRIPTION OF THE DRAWINGS

FIGURE 1 is a perspective view of the trailer hitch assembly in operative association with an automobile and trailer towbar.

FIGURE 2 is a perspective view of the multi-position axle bracket.

FIGURE 3 is a side elevational view of the removable head assembly and second set of spring bars taken along lines 3—3 of FIGURE 1.

FIGURE 7 is an enlarged view of the left portion of FIGURE 4.

FIGURE 8 is a view taken along line 8—8 of FIGURE 7 showing a spring bar locked within a socket.

FIGURE 9 is an enlarged perspective view of a first arm of the spring bar.

Similar reference numerals are used to refer to like parts in the several views illustrated.

PREFERRED EMBODIMENTS

Figure 4:
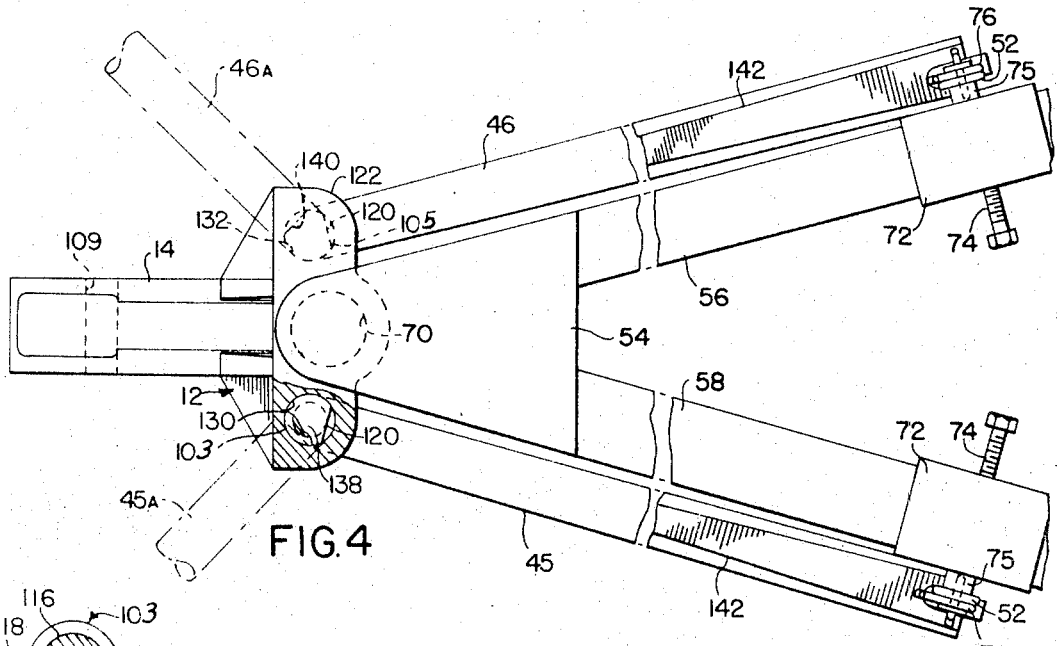
FIGURE 4 is a top plan view of the removable head assembly and second set of spring bars taken along lines 4—4 of FIGURE 3.

Referring now to the drawings with particular attention to FIGURES 1 and 3, the trailer hitch assembly 10 is comprised in part of a removable head assembly 12, said head assembly having an elongated drawbar segment 14 which is slidably inserted into a mating female rigid carrier tubular member 16. The carrier member is secured to the rear bumper 18 of an automobile by means of an adjustable bracket and chain assembly 20, the brackets 21 clipping into the topmost edge of the bumper, each chain 22 extending downwardly from one of said brackets to the side walls of the carrier tube where they terminate in a spring assembly 23, said spring assemblies being fixedly secured to the carrier tubes. The spring assemblies which provide the necessary tension to rigidly extend the chains 22 so that the carrier tube 16 is firmly fastened to the rear bumper may be any one of a number of readily commercially available helically wound metal springs.

Disposed forward of the rear bumper of the automobile are the conventional auto frame 24 and rear spring suspension systems 26. Located transversely between the two rear spring suspensions 26 is the rear axle 28 of the automobile and the differential gear housing 30. At the extremities of said rear axle are mounted the automobile's rear wheels 32 and 34. Fastened to the rear axle to the right and left of the differential gear housing 30 are two multi-position axle brackets 36 and 38 to which are pivotally secured a first pair of spring bars 40 and 42 which extend rearwards from said brackets 36 and 38 towards the rear bumper 18 of the automobile converging within a substantially Y-shaped collar member 44. The multi-position brackets 36 and 38 and the Y-collar member 44 are hereafter described in detail, and constitute two of the key features of the present invention which result in the interchangeable characteristics of the trailer hitch assembly 10.

Extending in a divergent manner from within the head member 12 where they are vertically pivotally secured, and rearwards of the automobile, are a second pair of torsion spring bars 45 and 46 which are substantially L-shaped. Fastened to the end of the horizontal leg 48 and 50 of each spring bar 45 and 46, respectively, is a flexible member 52 herein shown as a link chain.

Similarly extending rearwards of the head assembly 12 is the usual hitch extension 54 including the outwardly divergent frame members 56 and 58. As best seen in FIGURE 3, the underside of the hitch extension 54 is provided with the usual downwardly opening socket 60 for receiving the mating spherical head 62 of kingpin 64, said kingpin also being comprised of a cylindrical stem 66 which inserts within the central aperture 70 of the head assembly 12.

Resting upon each frame member 56 and 58 is mounting bracket 72, the inner side panel of which has a threaded opening receiving a bolt 74 which is tightened to secure the brackets to the frame members. With the brackets 72 in this position, the free ends of the chains 52 are rigidly extended vertically where they are secured to the bracket and frame members by means of a resilient retainer 76 after a chain link has been passed over and about a pin 75 welded to and extending away from the outer side panel of the bracket. One leg of the retainer 76 passes through said pin to prevent the retainer from working free due to road vibrations.

With particular reference to FIGURE 2, the multipurpose axle bracket 36 or 38 is comprised of a rectangularly or square shaped horizontal metal baseplate 78 upon which is welded, or otherwise attached, two vertical side plates 80 and 82, each side plate being shaped with a semi-circular indentation 84 adapted to receive the general rear axle profile when the baseplate 78 is mounted about the rear axle of an automobile. These vertical side plates will be hereafter referred to as the vertical axle seats.

Immediately adjacent to said vertical axle seats and located in the horizontal baseplate 78 near the four corners of said baseplate are four through-holes 80A into which are inserted, when the bracket 36 or 38 is properly seated and aligned relative to the rear axle 28, two relatively large U-bolts 86 and 88, the vertical legs of which are threaded at their extremities. As is apparent from FIGURES 1 and 2 with the baseplate 78 placed into abutting engagement against the underside of the rear axle, the vertical legs of each U-bolt 86 and 88 are inserted downwardly and embracingly about the rear axle into the holes 80A of the baseplate where said bolts are threadedly secured to the baseplate by means of nuts 89 and lock washers 90 attached to said vertical threaded legs at the underside of the baseplate. The nuts are tightened sufficiently to lock the bracket assembly about the rear axle. Additional throughholes 80A are provided to allow for various spacing distances between the U-bolts so that the assembly may accommodate the various sized axle shaft lengths.

Projecting downwardly from the underside of the baseplate are two vertical ribs 92 and 94 spaced about an inch apart and longitudinally and axially aligned with the vertical side plates located on the topside of the baseplate. In the approximate center of each rib is a hole 96. The two holes, one in each rib, are horizontally aligned so that when a spring bar 40 or 42 having a like hole 98 near its extremity is inserted between the ribs 92 and 94, and the three holes are all axially aligned, the spring bar may be pivotally secured to the baseplate by inserting a screw 100 through the ribs and spring bar, and fastening the assembly by means of a nut 101 and lockwasher 102. The pivotal attachment of the spring bar to the multi-position bracket allows for vertical adjustment of the spring bar at the Y-collar member 44 in those instances where the two ends of the spring bar lie in different horizontal planes.

It is clear from the foregoing description that the multiposition brackets and spring bars can be removed or installed without the need for any special tools or adapters, in a matter of minutes. The vertical legs of the U-bolts are sufficiently long and spaced far enough apart to accommodate any of the existing rear axle automobile profiles; and likewise the vertical axle seats have an indentation sufficiently wide to accommodate the widest of the existing automobile rear axle. Thus, the multiposition brackets are fully interchangeable from automobile to automobile.

With particular reference again to FIGURE 1, the Y-collar member 44 is comprised of two tubular legs 104 and 106 which converge at and are integral with the tubular carrier member 16, which, as earlier noted, is the member which is adapted to receive the drawbar segment 14 of the removable head assembly. Once said female tubular carrier member 16 has been mounted upon the rear bumper in the manner earlier described, the head assembly is secured therein by inserting the drawbar segment 14 into the carrier member, aligning two holes 108 in the side walls with a through hole 109 in the drawbar segment and inserting a pin 110 through said three openings when they are axially aligned. A resilient retainer is used to secure the pin 110 in position to prevent its working free due to normal road vibrations.

The lengths of the two converging tubular legs 104 and 106 are split, and said legs are internally sized to slidably receive within their inner walls spring bars 40 and 42. Extending radially from each leg are two tabs 114, one each positioned on either side of the split length, and positioned opposite each other so as to be juxtapositioned. In each tab 114 are three threaded holes, said holes being axially aligned with the like holes of its opposite counterpart located on the other side of the split length of the leg. Once the spring bar has been slidably inserted within one of the legs and adjusted to determine its overall length relative to its being pivotally secured to one of the multi-position axle brackets 36 or 38, three screws are inserted into the threaded holes located in tabs 114 and tightened to close the inner walls of the split length of the tubular leg about the spring bar until said bar is non-slidably secured within said tubular leg. The remaining spring bar is similarly mounted. Thus, to install that portion of the trailer hitch assembly 10 that is mounted and disposed between the rear axle 28 and the rear bumper 18, one would first mount tubular member 16 upon the rear bumper 18 by means of the two chain and bracket assemblies 20, insert the drawbar segment 14 of removable head assembly 12 into said tubular member 16, and then fasten thereto the head assembly by means of pin 110 passing through both members 14, 16. Next, the two multi-position brackets 36 and 38 would be installed in the manner earlier described upon the rear axle 28. Then spring bars 40 and 42 are slidably inserted within the convergent split tubular legs 104 and 106 of the Y-collar, respectively, and their lengths adjusted so that their free ends may be pivotally secured to the underside of the multi-positioned brackets 36 and 38. And as a final step once the bars 40 and 42 have been secured to the multi-position brackets 36 and 38, the bars would be non-slidably secured within the split tubular legs 104 and 106 in the manner earlier described. Note that the tubular legs 104 and 106, as best seen in FIGURE 1, have no end walls making it possible to extend the spring bars beyond the edge of the legs nearest the carrier member 14 and adjacent to the sides of the carrier member.

It is clear from the above installation sequence that no special tools are needed in installing that portion of assembly 10 that has thus far been disclosed, and that said installation is capable of being accomplished by one man in a matter of minutes. It is also clear that the assembly 10 as thus far disclosed is adapted for installation on any model automobile, the key factors in this interchangeability feature being the multi-position brackets 36 and 38 which are capable of accommodating any existing size rear automobile axle and the capability of being able to slidably adjust the length of the spring bars 40 and 42 within the converging legs 104 and 106 of the Y-collar 44 to allow for the variations in distances between the rear axle and rear bumper of the various sized automobile models available on the market.

In prior art trailer hitch assemblies telescoping rigid bars are normally used in place of spring bars 40 and 42, said telescoping bars generally being secured to the rear axle by means of a length of metal link chain wrapped several times about the rear axle. Disadvantages associated with said prior art assemblies are that the telescoping bars lacking spring qualities tend to have relatively short fatigue lives; the chains tend to work free from the axle due to road vibrations in the normal course of travel; and the rigid bars fail to absorb or transmit dynamic loads to the drive axle. Use of spring bars 40 and 42 disposed between the multi-position brackets 36 and 38 at the drive axle of the automobile and the Y-collar member 44 at the rear bumper 18 overcomes all these disadvantages.

Figure 5:
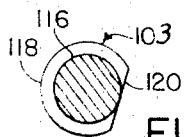
FIGURE 5 is a sectional view of the button segment of the vertical leg of one of said second set of spring bars.

With particular references now to FIGURES 3, 4, and 5, the means of attaching the second set of torsion spring bars 45 and 46 within the removable head assembly 12 will now be considered. Spring bars 45 and 46 are each fabricated to form a substantially right-angled member being comprised of vertical legs 103 and 105 and horizontal legs 48 and 50, respectively. As the two spring bars are identical, only spring bar 45 will be considered in detail. Near the upper end of the vertical leg 103 is an annular groove 116. Immediately above said groove 116 is a button segment 118, a portion of which has been ground off to the depth of the groove 116 to form a flat portion 120 as can best be seen in FIGURE 5.

The removable head assembly 12 is comprised of a drawbar segment 14 broadening out to a head segment 122 as can best be seen in FIGURE 4. Said head segment 122 as now can best be seen in FIGURE 3 being an essentially bifurcated member consisting of an upper horizontally projecting flange 124 and a lower horizontally projecting flange 126. The lower flange 126 has two like through-openings disposed to the right and left of the drawbar segment 14. Vertically and axially aligned with the two through-openings 128 of the lower flange 126 are two cylindrical bores 130 and 132 extending upwardly from the bottom surface 134 of the upper flange and having a roof 136. Each bore 130 and 132 is provided with an inwardly projecting lug 138 and 140, respecitvely, which extend only part way around the periphery of the bore. Relative to the drawbar 14 within their respective bores the lugs 138 and 140 are located in the outer semicircle of the bore. But, within this outer semicircle of the bore, each lug is located in the quadrant nearest the drawbar so that the two lugs with respect to each other are positioned as if though in mirror image relationship.

It will be noted at this time that the flat portion 120 is tangent with the inner wall periphery of said annular groove 116. In prior art devices the flat portion is ground further back so that said inner wall would have a flat portion, and would not be fully circular peripherally as in the present device as best seen in FIGURE 5. This means that prior art bars must be allochirally arranged. The disadvantage associated with such an arrangement is that the bars are not fully interchangeable from side to side. Such a bar may be seen in U.S. Patent No. 2,817,541 by Mathisen. By not cutting mack beyond the inner wall of groove 116 it is possible to make the two bars fully interchangeable and having the attendant advantages of making for more rapid assembly as one does not have to determine by trial and error or visual check which bar goes into which socket in the head assembly. Other advantages relate to manufacturing as one cutting back operation will accommodate all bars and to inventorying in that only one type bar rather than two types need be stocked.

As the two spring bars 45 and 46 are identical, they are interchangeable within the cylindrical bores 130 and 132 of the head assembly 12. With particular attention to spring bar 45, the bar is quickly inserted into the head 12 by inserting said bar upwardly through the through-opening 128, rotating it until the bar is positioned as shown by the phantom lined bar 45a. In this position the flat vertical face of the lug 138 and the flat vertical face of the button segment 118 of the vertical leg 103 will be juxtapositioned as the vertical leg is pushed further upwardly into the cylindrical bore 130. When the top surface of the button 118 strikes the roof 136, the spring bar is then rotated, either clockwise or counterclockwise, from the above "insertion position" to its "mounting or locked" position where its horizontal leg is aligned with the trailer bar 58. Similarly spring bar 46 is inserted through through-opening 128, rotated until it assumes the "insertion position" shown in phantom at 46a, urged further upwardly until the button segment 118 clears the lug 140 which is indicated by the top surface of the button segment of vertical leg 105 striking the roof of bore 132, then rotating bar 46 clockwise (as bar 45 has already been inserted) to its "mounted or locked" position where it is aligned with trailer bar 56.

To remove the completed head assembly from the auto when not using the hitch to tow a trailer, it is only necessary to remove the resilient retainers 76 from pins 75 to free the chains 52, then rotate the spring bars to their respective "insertion" positions and pull the bars downwardly. This affords the usual clear view of the rear license plate and avoids the permanent rearwardly extending protrusion of the usual hitch or ball hitch units.

The horizontal legs of the spring bars have a flattened or tapered portion 142 adjacent to its chain-connecting end. The spring bars 45 and 46 act essentially as springs and absorb the usual road shocks incurred when the automobile carries a towed load. The bars also perform a second function, that of performing as anti-sway bars in turning operations of the vehicle.

Figure 6:
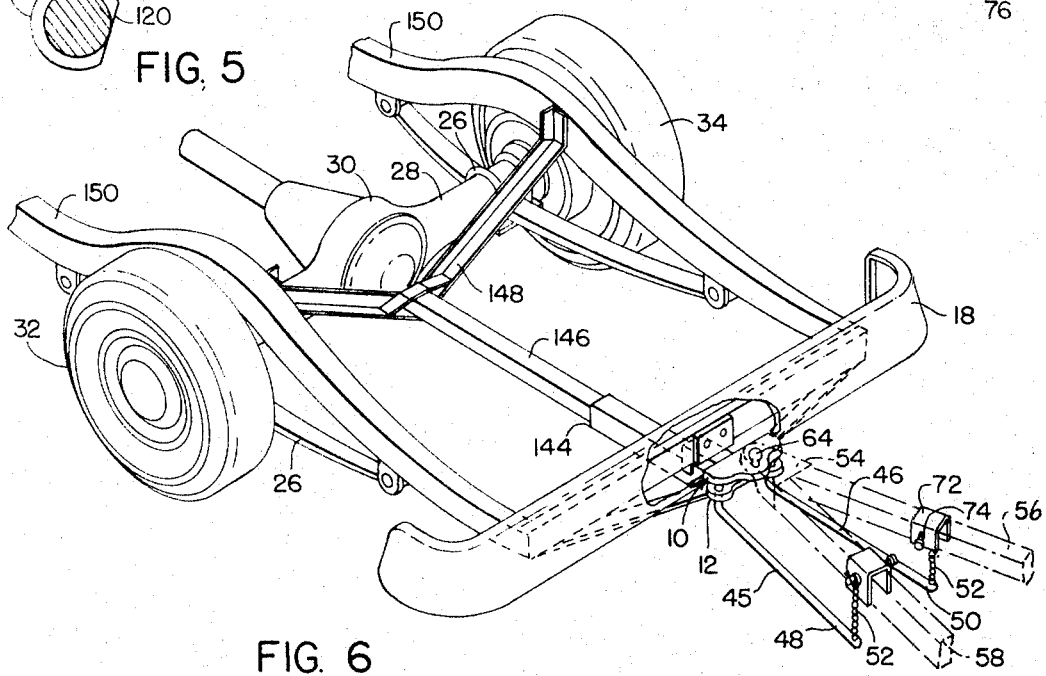
FIGURE 6 is a perspective view of a secondary embodiment of said invention designed to carry heavier weights than the preferred embodiment depicted in FIGURE 1.

Bars 40 and 42, being connected to the rear drive axle distribute the loads on the drive wheels 32 and 34. Where the load to be towed is light, 200 to 300 pounds, this configuration is satisfactory. However, when heavier loads are to be towed, in the range of 400 to 600 pounds, the embodiment of FIGURE 6, which distributes the load through the frame of the automobile to its four wheels, is preferred. With particular reference to FIGURE 6, a cutaway view of the automobile having a trailer hitch assembly 10 inserted within a mating female portion 144 of a telescopic bar 146 which extends from the rear bumper 18 of the automobile to an anchor bar 148 disposed transversely between and securely attached to the two side frame members 96 of the automobile. The head assembly 12 inserts within the female portion 144 of the bar 146 where it is secured by means of a pin. It is clear from the above description that the weight of the load will be transferred along through the bar 146 to the anchor bar 148 where it is transmitted equally to the side frame members 150 and 152, and from there to the four wheels of the vehicle.

In the assembly disclosed in FIGURE 6 the removable head member 12 is sized slightly larger than its counterpart disclosed in FIGURES 3 and 4, and as a result has a slightly larger central opening 70 than its lighter counterpart. However, it is possible to use the same kingpin 60 to secure the hitch extension 54 to the head assembly 12, and this is accomplished by inserting a bushing (not shown) in said aperture to prevent the kingpin from being free to wobble within said aperture. In all other details the two head assemblies are similar.

What is claimed and desired to be secured by Letters Patent is:

1. A multi-position bracket for removably securing a bar member to an elongated member, such as a vehicle axle, comprising in combination:
    a bracket platform having a plurality of pairs of apertures therein;
    a pair of U-shaped bolts each being adapted to be disposed about said elongated member and each having threaded end portions adapted to be inserted in said apertures in said bracket platform;
    a first pair of parallel flanges integrally formed on the major surface of said platform closest to said elongated member and having a shape to mate generally with said elongated member;
    nut means adapted to be threadedly secured on the end portions of said U-shaped bolts which protrude through said apertures on the major surface of said platform remote from said elongated member;
    a second pair of parallel flanges integrally formed on the major surface of said platform remote from said elongated member and each having a hole therein aligned with a corresponding hole in the other flange of said second pair of flanges;
    said bar member having an end portion provided with a hole therethrough and adapted to be inserted between said second pair of parallel flanges;
    a bolt adapted to be inserted through said hole in one flange of said second pair of flanges, said hole in said bar member, and said hole in the other flange of said second pair of flanges; and
    nut means adapted to be secured to threaded end of said bolt;
    whereby said U-shaped bolts may be selectively positioned in any pair of apertures in said platform in order to facilitate securement to various shaped elongated members.

2. An auxiliarly locking and spring bar for use with a trailer hitch comprising a first arm and a second arm disposed at a selected angle with respect to one another, said first arm having a peripheral groove extending therearound in selected spaced relation with respect to the free terminal end thereof and separated therefrom by a segmental lug, said segmental lug being symmetrical with respect to a plane bisecting said first and second arms.

3. A device as defined in claim 2 wherein said segmental lug is provided by an annular rib having a flat chordal surface disposed substantially parallel to the axis of said first leg and substantially perpendicular to said plane.

4. A device as defined in claim 3 wherein said flat surface is substantially tangent to the root of said groove.

5. In a trailer hitch having a member adapted to be attached adjacent the trailing end of a towing vehicle and including a pair of auxiliary bars detachably securable to such member and disposed one on each side of a longitudinal axis extending through the towing vehicle, the towed vehicle and the connection therebetween, the improvement comprising identical and interchangeable bars having a first arm and a second arm disposed at a selected angle to one another, said first arm having a peripheral groove extending therearound in selected spaced relation with respect to the free terminal end thereof and separated from the latter by a segmental lug, said segmental lug being substantially symmetrical with respect to a plane bisecting said first and second arms.

6. An auxiliary bar for use in a trailer hitch coupling or the like which includes a socket for receiving a selected portion of such bar and having a portion of locking means in said socket co-operating with the portion on the bar preventing removal of the latter from said socket during selected arcuate movement about an axis substantially coincident with the axis of the socket, said bar comprising:
    (a) a first arm having a selected free end portion insertable into said socket, said insertable portion having a longitudinal axis;
    (b) a second arm secured to said first arm in selected spaced relation with respect to said insertable free end portion, said second arm having a longitudinally extending portion disposed at a selected angle with respect to the longitudinal axis of said first arm; and
    (c) at least one segmental lug on said insertable free end portion of said first arm and adapted to engage a member in said socket to prevent removal of the bar from the socket during selected arcuate movement above said longitudinal axis, said segmental lug being substantially symmetrical with respect to a plane bisecting said first and second arms such that the bar is insertable into and removable from the socket upon arcuate movement in opposite directions respectively beyond each of a first and a second limit of arcuate movement.

7. A device for use in further interconnecting a pair of articulately connected members, said device comprising:
    (a) a first arm adapted to be connected to one of said pair of members for pivotal movement about a selected fixed axis;
    (b) a second arm secured to said first arm and extending therefrom at an angle to said axis and adapted to be secured to the other of said pair of members; and
    (c) means preventing sliding movement of said first arm relative to the member associated therewith in a direction parallel to said axis during selected arcuate movement having a limit of movement in a first direction about said axis and similarly a limit in a second direction of movement opposite to that of the first, and permitting such sliding movement during further arcuate movement, said means comprising a groove extending around said first arm in selected spaced relation with respect to the free end thereof and separated therefrom by at least one segmental lug, said lug being substantially symmetrical with respect to a plane bisecting said first and second arms.

8. An auxiliary bar for use with a trailer hitch or the like which includes a first member having a socket provided with an internal segmental lug and adapted to receive a selected end portion of said bar, said bar comprising a first leg having a terminal end adapted to fit within said socket, an annular groove in said first leg and extending therearound for receiving the segmental lug of the first member, a segmental lug adjacent said annular groove and the free end of said first leg, said segmental lug being substantially symmetrical with respect to a plane bisecting said first and second arms and disposed at a selected distance from the longitudinal axis of said first leg, said terminal end portion being adapted to be inserted into said socket when the segmental lugs of the first member and said bar are oriented in offset relation about said longitudinal axis and adapted to be locked to said first member by rotating said bar relative to said first member so that said internal segmental lug is disposed within said annular groove.

9. An auxiliary bar for use with a first member having a socket provided with an internal segmental lug, said auxiliary bar including a first arm and a second arm disposed in selected angular relation with respect to one another, said first arm having a first end portion adapted to fit into said socket, said first end portion having an annular groove surrounding a second portion which has a shape that is geometrically similar to and concentric with said first end portion and a third portion adjacent said annular groove which has a shape that is a geometrical segment substantially symmetrical with respect to a common plane bisecting said first and second arms and having a flat chordal plane disposed at a distance from the longitudinal axis of said first portion that is substantially equal to or greater than the smallest radius of said second portion and substantially transverse to said common plane, said first end portion of said first arm being adapted to be inserted into said socket when said flat chordal plane of said third portion is oriented parallel to and adjacent to said internal segmental lug in said socket, said first arm being adapted to be locked to said first member by rotating said first arm relative to said first member so that said internal segmental lug is disposed within said annular groove.

10. A locking device comprising, in combination, a first member having at least two sockets therein, each of said sockets being provided with an internal segmental lug, identical second and third L-shaped members each including on one leg thereof a first, second and third portion, said first portion having a shape adapted to fit within either of said sockets and including an annular groove surrounding the second portion, said second portion, having a shape that is geometrically similar to and concentric with said first portion, said third portion being disposed adjacent said annular groove and having a shape that is a geometrical segment symmetrical with respect to a plane bisecting the L-shaped member, said segment having a flat chordal plane disposed at a predetermined distance from the longitudinal axis of said first portion, said second or third members being adapted to be inserted into either of said sockets when said flat chordal plane of said third portion is oriented parallel to and adjacent to the internal segmental lug of the socket and adapted to be locked to said first member by rotating said second or third member relative to said first member so that said internal segmental lug is disposed within said annular groove.

11. A trailer hitch adapted to be removably secured to a towing vehicle, said hitch comprising in combination:
(a) a first member having
(i) means associated therewith to articulately connect said member to the drawbar of a vehicle to be towed:
(ii) a first socket disposed on one side of said means and having an internal segmental lug arranged in a quadrant of said first socket nearest said towing vehicle when said hitch is mounted on said towing vehicle;
(iii) a second socket disposed on the opposite side of said means and having an internal segmental lug arranged in mirror image relation with respect to the lug in said first socket in a quadrant of said second socket nearest said towing vehicle when said hitch is mounted on said towing vehicle; and
(b) a pair of identical and interchangeable spring bars having one end thereof adapted to be connected to a portion of said vehicle to be towed and the other end insertable into respective ones of said first and second sockets, each spring bar having a first arm and a second arm disposed at a selected angle with respect to one another, said first arm being relatively short with respect to said second arm and having a peripheral groove extending therearound in selected spaced relationship with respect to the free terminal end thereof and separated from the latter by a segmental lug substantially symmetrical with respect to a common plane bisecting said first and second arms, said first arm of said pair of bars being insertable into respective ones of said first and second sockets when the segmental lug in the socket and the segmental lug on the spring bar associated therewith are offset with respect to one another about the longitudinal axis of said first arm and locked therein upon selected rotational movement of said first arm about said axis whereby the lug in said socket is located within the groove in said bar.

12. A trailer hitch for use in towing apparatus comprising;
(a) a member detachably securable to a predetermined portion of a towing vehicle adjacent the trailing end thereof and having at least two sockets therein, each of said sockets having an inwardly-extending lug; and
(b) at least two identical and interchangeable spring bars each including an elongated body portion adapted to be secured to an article to be towed and a socket-engaging arm formed at the other end thereof substantially perpendicular to said elongated body portion, said socket engaging arm terminating in an end portion having a substantially flat surface with the plane thereof substantially parallel to the longitudinal axis of said arm and substantially perpendicular to a plane bisecting said elongated body portion and said arm, and a groove disposed substantially normal to said flat surface, said socket-engaging arm being adapted to be inserted into any one of said sockets when said lug is aligned with said flat surface and then rotatable to a locked position wherein said lug lies in said groove to lock said arm in said socket and permit limited arcuate movement of said arm in said locked position whereby said identical spring bars are adapted to absorb jolts between said towing vehicle and said article to be towed while simultaneously permitting limited pivoting of each socket-engaging arm relative to its mating socket.

13. Towing apparatus comprising in combination, a towing vehicle, a trailer hitch removably secured to said towing vehicle adjacent the rear bumper thereof, said trailer hitch including a first section disposed below said rear bumper and extending toward the rear axle of said towing vehicle, and a second section disposed adjacent said rear bumper and extending rearwardly therefrom, said first hitch section having a substantially horizontal aperture extending therethrough, and a pair of vertical substantially cylindrical sockets having their openings in the lower surface of said second hitch section, each of said sockets having an upper portion including an internal segmental lug disposed in a selected quadrant of the crosssection of said socket, an extension projecting forwardly of a trailer and having a vertical pin aperture disposed in its front section, a pin in said vertical pin apertures interconnecting said trailer hitch and said trailer extension, a pair of identical and interchangeable torsion rods each having a substantially vertical arm and a substantially horizontal arm consisting of an elongated tapered body, said vertical arm having an end portion provided with a circumferential groove and a segmental lug provided with a flat vertical section and being insertable into said socket when said flat section is aligned with said internal lug and being rotatable to a locked position whereby said internal lug is completely disposed in said groove, said segmental lug of said vertical arm being symmetrical with respect to a plane bisecting the vertical and horizontal arms of the respective rods, a pair of clips detachably secured to said trailer extension, and a pair of chains interconnecting respective ones of said clips and said torsion rods.

References Cited

UNITED STATES PATENTS

| | | |
|---|---|---|
| 2,788,228 | 4/1957 | Williamson 280—489 |
| 2,817,541 | 12/1957 | Mathisen. |
| 2,817,542 | 12/1957 | Wettstein. |
| 3,021,154 | 2/1962 | Hedgepeth. |
| 3,220,749 | 11/1965 | Mathisen. |
| 3,347,561 | 10/1967 | Hedgepeth. |

FOREIGN PATENTS 1,415,837  9/1965  France.

LEO FRIAGLIA, *Primary Examiner.*

U.S. Cl. X.R.

280—406